Oct. 22, 1968         E. F. BURKE         3,406,932
SUPPORTING SYSTEM FOR CABLES AND THE LIKE
Filed Nov. 9, 1966                    3 Sheets-Sheet 1
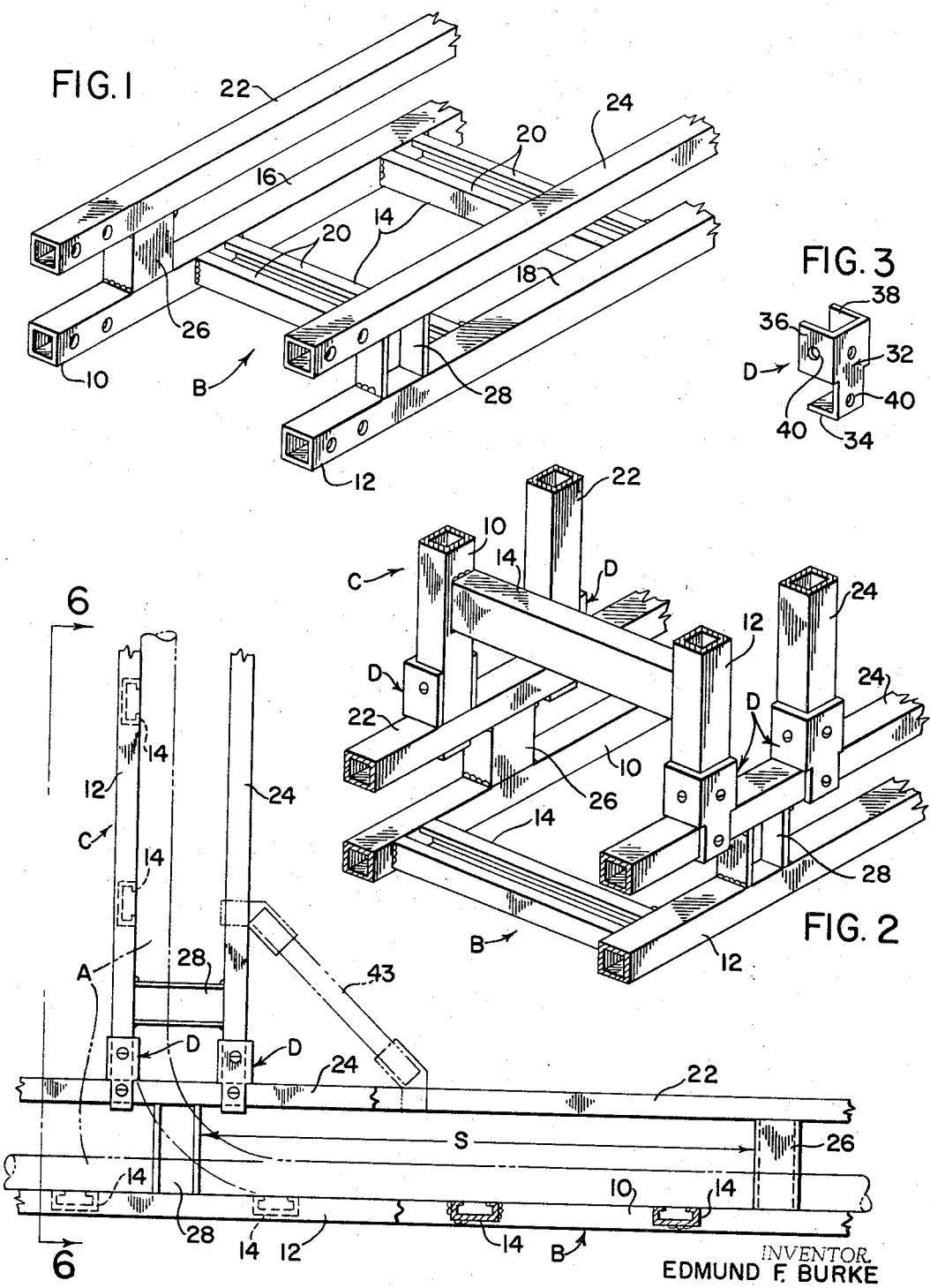
INVENTOR.
EDMUND F. BURKE
BY
Meyer, Tilberry & Body
ATTORNEYS Oct. 22, 1968   E. F. BURKE   3,406,932
SUPPORTING SYSTEM FOR CABLES AND THE LIKE
Filed Nov. 9, 1966   3 Sheets-Sheet 2
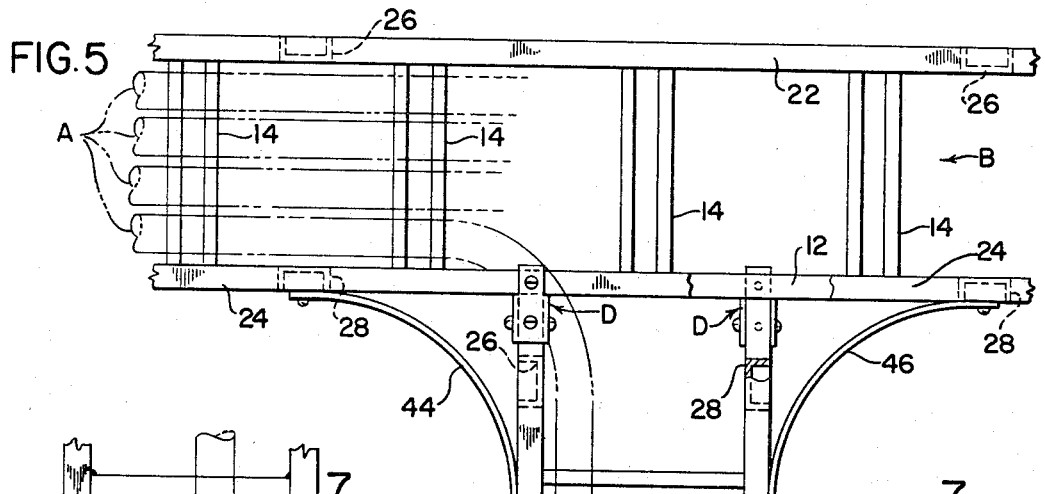
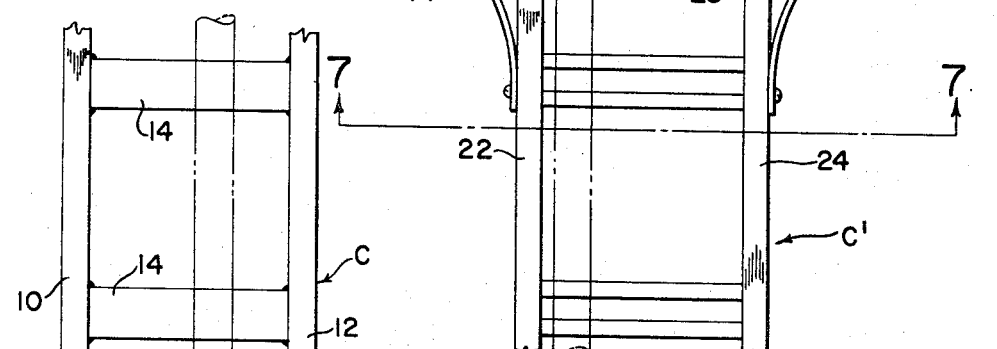
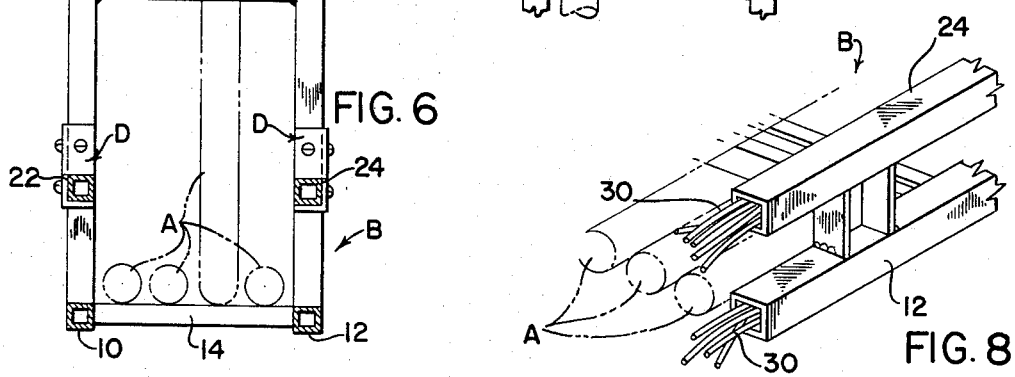
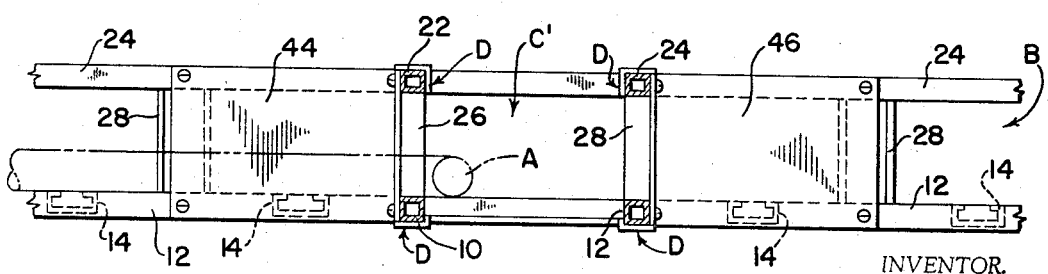
INVENTOR.
EDMUND F. BURKE
BY
Meyer, Tilberry & Body
ATTORNEYS Oct. 22, 1968  E. F. BURKE  3,406,932
SUPPORTING SYSTEM FOR CABLES AND THE LIKE
Filed Nov. 9, 1966  3 Sheets-Sheet 3
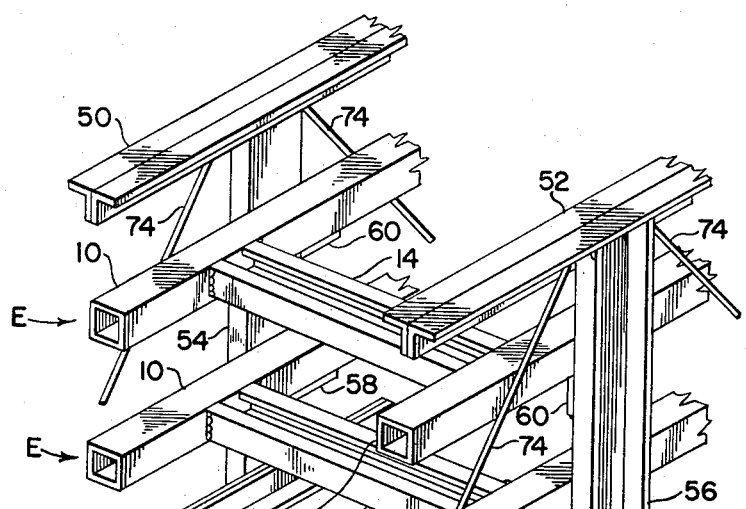
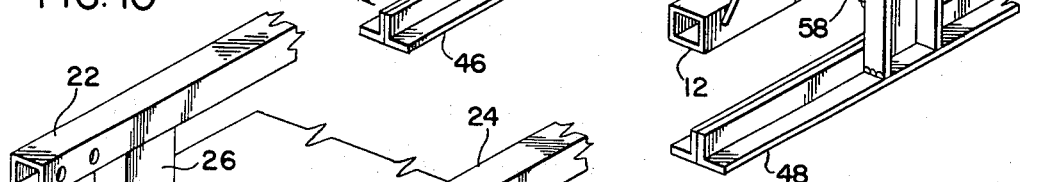
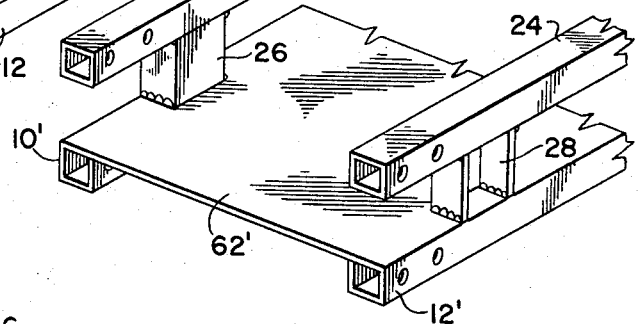
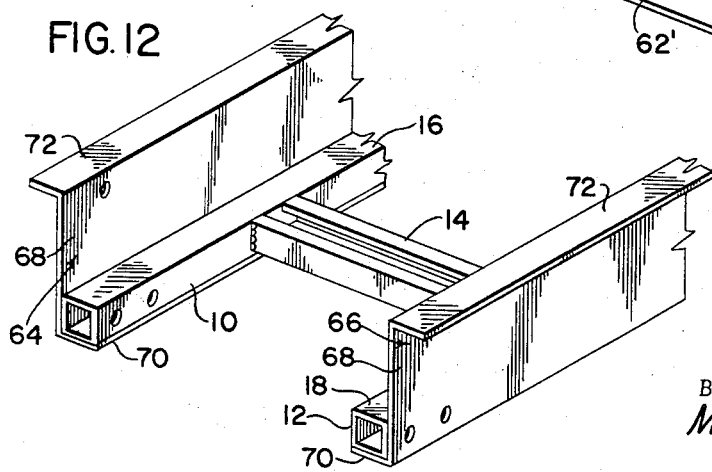
INVENTOR.
EDMUND F. BURKE
BY
Meyer, Tilberry & Body
ATTORNEYS United States Patent Office 3,406,932
Patented Oct. 22, 1968

3,406,932
SUPPORTING SYSTEM FOR CABLES
AND THE LIKE
Edmund F. Burke, 3645 Warrensville Center Road,
Cleveland, Ohio 44122
Filed Nov. 9, 1966, Ser. No. 593,090
10 Claims. (Cl. 248—68)

ABSTRACT OF THE DISCLOSURE

A support for cables, wires, and similar items including a longitudinally extending support section and strengthening means substantially coextensive with the support section but spaced from the support section, the support section comprising a pair of spaced longitudinally extending support members with cable carrying means extending transversely between and secured to the support members. The cable contacting surfaces of the cable carrying means are at least coplanar or above the top surface of the support members so that branch runs have access to the main run without interrupting the longitudinal support for the main run. The strengthening means is connected to the cable support section by connections which are spaced apart in a longitudinal direction to avoid interference by the connections with the access between the main and branch runs.

---

This invention relates to the art of supports for cables, wires, conduits, raceways, piping, tubing, and the like, over open spans and, more particularly, to an improved system for supporting a main run and a branch run of cables in such a manner to permit the branch run to have access to the main run without interrupting the longitudinal support for the main run.

The invention is particularly applicable in conjunction with supporting electrical cables, and the like, over open spans and will be described with particular reference thereto; although, it is to be appreciated that the invention has broader applications and may, for example, be used wherever support applications require that a branch member have access to a main run of members.

Cable support systems known heretofore have included ladder supports and tray or trough supports. These supports include a pair of longitudinally extending side members, and cable carrying means extending transversely between the side members. The carrying means for the ladder supports take the form of a plurality of longitudinally spaced rungs extending transversely between the side members. The carrying means for the tray or trough supports include a solid deck or a perforated deck, such as a mesh screen, extending transversely between the side members. Each of these supports has a U-shaped cross section defining a channel, with the cable carrying means defining the floor of the channel. The upstanding sides, defined by the side members, are solid or perforated, such as mesh, and serve to hold cables and the like in place in the channel.

A notable problem, however, with such cable supports occurs when one or more of the supported cables is to be turned from the main run to extend along a branch run, either vertically or horizontally of the main run. This problem resides in the common practice heretofore of completely severing the longitudinal support for the main run and then inserting a suitable fitting, such as an elbow, a T or a cross. The fitting couples a main run support with a branch run support so that the branch run has access to the main run. This severing process interrupts the longitudinal support for the main run and thus weakens the structural strength of the main run support. Also, when designing a cable support system it is necessary, using such previous cable supports, to draft a layout showing all of the required fittings, as well as to have a supply of such fittings.

The present invention is directed toward a system for supporting cables and the like so that branch runs have access to a main run without interrupting the longitudinal support for the main run, thereby overcoming the noted disadvantages, as well as others, of such previous cable support systems.

In accordance with the present invention, the support system comprises a main run support and at least one branch run support, wherein each of the supports includes: a pair of spaced longitudinally extending support members; and cable carrying means extending transversely between and secured to the support members, with the cable carrying means having a cable contacting surface. The cable contacting surfaces of the main run substantially define a horizontal plane, and the support members of the branch run support extend at an angle to the support members of the main run support. The branch run support members are secured, as by clamps, to the main run support members intermediate the longitudinal length of the latter, so that the branch run has access to the main run without interrupting the longitudinal support for the main run.

In accordance with a more limited aspect of the present invention, at least one of the supports includes a second pair of longitudinally extending members located on the same side and spaced from the first pair of members, and a plurality of longitudinally spaced side members securing each of the second pair of members with one of the first pair of members, with the spacing between the side members being sufficient to admit entrance or exit of a plurality of cables.

The primary object of the present invention is to greatly simplify the design procedures and erection of a supporting system for cables and the like.

Another object of the present invention is to provide an improved cable support system whereby branch runs have access to a main run without interrupting the longitudinal support for the main run.

A still further object of the present invention is to provide a cable support system which is simple in construction and economical to manufacture.

A still further object of the present invention is to provide a cable support system which eliminates the need to prepare detailed layout drawings showing all of the required fittings.

A still further object of the present invention is to provide a cable support system wherein the variety and number of fittings required to secure branch run supports to a main run support are substantially reduced.

A still further object of the present invention is to provide a system whereby changes or additions to an installation may be easily made during the installation process as cable routing problems arise.

These and other objects and advantages of the invention will become apparent from the following description of the preferred embodiments of the invention as read in connection with the accompanying drawings in which:

FIGURE 1 is a perspective view illustrating the preferred embodiment of a cable support;

FIGURE 2 is a perspective view illustrating an assembly of two cable supports, each constructed in accordance with that illustrated in FIGURE 1, making a transition from horizontal to vertical;

FIGURE 3 is a perspective view illustrating a clamp for securing supports together, as shown in FIGURE 2;

FIGURE 4 is an elevational view illustrating an assembly of two cable supports to provide a horizontal main run support and a vertical branch run support;

FIGURE 5 is a plan view illustrating a cable support assembly to provide a horizontal main run support and a horizontal branch run support;

FIGURE 6 is a view taken along line 6—6 looking in the direction of the arrows in FIGURE 4;

FIGURE 7 is a sectional view taken along line 7—7 looking in the direction of the arrows in FIGURE 5;

FIGURE 8 is a perspective view of a portion of the view illustrated in FIGURE 1 showing an application of the support;

FIGURE 9 is a perspective view illustrating a second embodiment of the cable support;

FIGURE 10 is a perspective view illustrating a third embodiment of the cable support;

FIGURE 11 is a perspective view illustrating a fourth embodiment of the cable support; and FIGURE 12 is a perspective view illustrating a fifth embodiment of the cable support.

Referring now to the drawings, wherein the showings are for purposes of illustrating preferred embodiments of the invention only and not for purposes of limiting same, FIGURE 4 generally illustrates a system for supporting cables A, or the like, with a horizontal main run support B and a vertical branch run support C, with the supports being secured together by means of clamps D. Supports B and C are identical in construction and, accordingly, only support B is described in detail hereinafter with reference to FIGURE 1.

Support B includes a pair of parallelly spaced, longitudinally extending support members 10 and 12. The cable carrying means in the preferred embodiment of the invention includes a plurality of longitudinally spaced rungs 14 extending transversely between and secured, as by welding, to support members 10 and 12. As shown in FIGURE 1, support members 10 and 12 are hollow throughout their lengths and are of rectangular shape in cross section. Rungs 14, as shown in FIGURE 1, are substantially C-shaped in cross section, with the opening of the C configuration facing upwardly. The upper surfaces 16 and 18 of members 10 and 12, respectively, and the upper surfaces 20 of rungs 14 are shown as being substantially coplanar. Surfaces 16 and 18, however, may be slightly below surfaces 20. Spaced upwardly from the surfaces of members 10 and 12 there is provided a second pair of parallelly spaced, longitudinally extending side rail members 22 and 24, each preferably constructed in the same manner as support members 10 and 12. A plurality of longitudinally spaced side members 26 are interposed between and secured, as by welding, to members 10 and 22. Similarly, a plurality of longitudinally spaced side members 28 are interposed and secured, as by welding, to members 12 and 24. Adjacent side members 26 and 28 are spaced a sufficient distance S (see FIGURE 4) from each other so that the sides of the cable support are essentially open, permitting a plurality of cables to have access to the main run. As shown in FIGURE 8 with respect to members 12 and 24, the respective members 10, 12, 22 and 24 are hollow throughout their lengths to permit a plurality of wires 30 to be threaded therethrough, thereby providing a substantially sealed, closed conduit for protecting the wires from damage, and providing magnetic shielding.

Two or more of the cable supports, each constructed as shown in FIGURE 1, may be assembled together to obtain the construction illustrated, for example, in FIGURES 2, 4 and 6. The assembly may be made with the use of clamps D, an example of which is shown in FIGURE 3. Clamps D each includes a backing plate 32, having flanges 34, 36 and 38 extending perpendicularly therefrom. Flanges 36 and 38 lie in parallel planes extending perpendicularly of the plane defined by flange 34. The channel-like space defined by flanges 36 and 38 is sufficient to receive one of the members 10, 12, 22 or 24. Similarly, the channel-like spacing defined by flange 34 and the facing edges of flanges 36 and 38 is sufficient to receive one of the members 10, 12, 22 or 24. Clamps D may be provided with suitable apertures 40 to permit the clamps to be positively secured to the cable support with suitable bolt or screw fasteners, if desired. It has been found from practice, however, that it is not always necessary to secure the clamps with such bolt or screw fasteners.

As shown in FIGURES 2, 4 and 6, a vertical branch run support C is secured by means of clamps D to the horizontal main run support B intermediate the latter's length. The channels defined by flanges 36 and 38 of four clamps D serve to respectively receive the ends of members 10, 12, 22 and 24. The channels defined by flanges 34, and the facing edges of flanges 36 and 38 of clamps D secured to members 12 and 24 serve to receive portions of the length of rail member 24, as shown in FIGURE 2. Similarly, the channels defined by flange 34 and the facing edges of flanges 36 and 38 of clamps D secured to members 10 and 22 serve to receive portions of the length of rail member 22. If desired, suitable branches 43 may be used to interconnect and stiffen the junction between vertical support C and horizontal support B. With a cable support system constructed as shown in FIGURES 2, 4 and 6, the main run of cables A is carried by rungs 14 of support B, and one or more of the cables may extend vertically upward through the open space between members 22 and 24 of support B, and thence in engagement with rungs 14 of vertical support C. The upwardly extending cable may be secured to rungs 14 of support C as by suitable bands or clamps.

Reference is now made to FIGURES 5 and 7 which illustrate a cable support system including a horizontal main run support B and a horizontal branch run support C' connected to support B intermediate the latter's length by means of clamps D. As best shown in FIGURE 7, the upper members 22 and 24 of support C' are secured by clamps D to member 24 of support B. Similarly, the lower members 10 and 12 of support C' are secured by clamps D to member 12 of support B. Thus, in this manner, the upper surfaces 16 and 18 of members 10 and 12 and the upper surfaces 20 of rungs 14 of both supports B and C are substantially coplanar, permitting relatively unobstructed routing of one or more cables from the main run into the branch run, supported by support C'. If desired, radius guides 44 and 46 for guiding the cable may be secured, as shown in FIGURES 5 and 8, to supports B and C'. The radius guides may be constructed of sheet metal, and, as shown in FIGURE 7, are suitably secured, as by hooks or nut and bolt arrangements, to supports B and C'.

It will now be appreciated that by assembling a cable support system as shown in the assembly of FIGURES 2, 4 or 6, or in the assembly as shown in FIGURES 5 and 7, there has been provided a system wherein a branch run is permitted entrance and exit from a main run without disrupting the longitudinal support for the main run, as has been common in the cable support systems known heretofore. In addition, since the upper surfaces of rungs 14 of supports B and C' are substantially coplanar, and that adjacent side members 26 or 28 are substantially spaced from each other, one or more cables may be easily, and without encountering obstructions, routed from the main run to the branch run. Also, with respect to the assemblies shown in FIGURES 2, 4 and 6, the continuous opening between top members 22 and 24 permits unobstructed routing of one or more of the cables from the main run to the branch run, supported by vertical support C. In either assembly, the routing of a cable from the main run to the branch run is obtained without interrupting the longitudinal support for the main run.

Reference is now made to FIGURE 9 which illustrates a second embodiment of the cable support. This embodiment is similar to that as illustrated in FIGURE 1, and, accordingly, like character references are used in FIGURE 9 to identify like components. This embodiment includes one or more ladder type cable supports E supported, in turn, by a support F. Each support E includes a pair of parallelly spaced, longitudinally extending support members 10 and 12 interconnected with a plurality of longitudinally spaced rungs 14 and extending transversely between the two members. Members 10 and 12 and rungs 14 are constructed in accordance with that previously described with reference to FIGURE 1. Support F includes two bar joists or trusses with substantially open sides, consisting of bottom chords 46 and 48, top chords 50 and 52, and web members 74. A plurality of vertically extending, longitudinally spaced side members 54 are interposed between and secured at opposite ends to chords 46 and 50. Similarly, a plurality of vertically extending, longitudinally spaced members 56 are interposed between and secured at opposing ends to chords 48 and 52. Lower and upper L-shaped brackets 58 and 60 are secured, as by welding, to the inwardly facing surfaces of side members 54 and 56. Each bracket has an inwardly facing leg on which a portion of the length of a support E rests.

Reference is now made to FIGURE 10 which illustrates a third embodiment of the cable support. This embodiment is similar to that as illustrated in FIGURE 1 and, accordingly, like character references are used in FIGURE 10 to identify like components. This embodiment differs from that illustrated in FIGURE 1 in that the cable carrying means includes a deck 62 which defines a substantially continuous, longitudinally extending cable carrying surface, as opposed to the noncontinuous surface defined by rungs 14 in FIGURE 1. Deck 62 may be solid, as shown in FIGURE 10, or perforated, or meshed. As shown in FIGURE 10, the longitudinal side edges of deck 62 overlay and, hence, are supported by the upper surfaces 16 and 18 of support members 10 and 12, respectively. If desired, the longitudinal side edges of deck 62 may be more rigidly secured to members 10 and 12, as by welding.

Reference is now made to FIGURE 11 which illustrates a fourth embodiment of the cable support. This embodiment is similar to that as illustrated in FIGURE 10, and, accordingly, like character references are used in FIGURE 11 to identify like components. This embodiment, like that shown in FIGURE 10, includes a deck which defines a substantially continuous longitudinally extending cable carrying surface. The embodiment shown in FIGURE 10 includes three separate strength components; that is, members 10, 12 and deck 62. In FIGURE 11, however, these separate strength components are replaced by integrally formed or extended members 10', 12' and deck 62', corresponding with members 10, 12 and deck 62 illustrated in FIGURE 10. Deck 62' may, in the same manner as deck 62, be solid, perforated or meshed.

Reference is now made to FIGURE 12 which illustrates a fifth embodiment of the cable support. This embodiment is similar to that as illustrated in FIGURE 1 and, accordingly, like character references are used in FIGURE 12 to identify like components. This embodiment, in a manner similar to that illustrated in FIGURE 1, includes a pair of spaced longitudinally extending support members 10 and 12 having a plurality of longitudinally spaced rungs 14 extending transversely between members 10 and 12. This embodiment, however, deviates from that as shown in FIGURE 1 by the inclusion of solid side members 64 and 66. Side members 64 and 66 are each shown as substantially Z shaped in cross section, as defined by a vertical section 68, having an inwardly extending flange 70 and an outwardly extending flange 72. As shown in FIGURE 12, the inwardly facing flange 70 of side members 64 and 66 serve to respectively support members 10 and 12. If desired, flange 70 may be secured to members 10 and 12, as by welding. The side members 64 and 66 are preferably constructed of light gauge sheet metal so that during installation a portion of the length of one of the side members may be easily cut away, as by a suitable saw, without cutting the longitudinal support members 10 and 12. Thus, having cut away such a portion of one of the side members 64, 66, the embodiment illustrated in FIGURE 12 may be joined with another of the embodiments of the cable support in the manner as shown in FIGURES 4 or 5 so that a branch run has access to a main run without interrupting the longitudinal support for the main run.

The embodiments shown in FIGURES 10 and 11 may be supported singly or in multiple in the same manner as shown in FIGURE 9.

The invention has been described in connection with particular embodiments of the invention, but is not to be limited to same. Various modifications may be made without departing from the scope and spirit of the present invention as defined by the appended claims.

Having thus described my invention, I claim:

1. In a cable support system for supporting a main run and a branch run of cables so as to permit the branch run to have access to said main run without interrupting the longitudinal support for said main run and comprising:
   a main run support and at least one branch run support, each said support including:
      a pair of spaced longitudinally extending support members;
      cable carrying means extending transversely between said support members;
      said cable carrying means having a cable contacting surface;
      said cable contacting surface of said main run support defining substantially a horizontal plane, the upper surfaces of said main run support members being not higher than said plane;
      said branch run support members extending at an angle to said main run support members;
      means securing said branch run support members to at least one of said main run support members intermediate the longitudinal length of the latter so that said branch run has access to said main run without interrupting the longitudinal support for said main run;
      at least one of said supports including a pair of longitudinally extending strengthening members located on the same side and spaced from said cable contacting surfaces of said support members; and
      a plurality of longitudinally spaced side members securing each of said strengthening members with one of said support members, the spacing between adjacent said side members being sufficient to admit entrance or exit of at least one of said cables.

2. In a cable support system as set forth in claim 1, wherein said longitudinally extending support members are hollow, permitting wiring to be threaded therethrough.

3. In a cable support system as set forth in claim 1, wherein said cable carrying means and said spaced longitudinally extending support members are integrally formed as a single unit.

4. In a cable support sytem for supporting a main run and a branch run of cables so as to permit said branch run to have access to said main run without interrupting the longitudinal support for said main run and comprising:
   a horizontally oriented main run support and at least one branch run support oriented at an angle to said main run support, each said support including:
      a pair of parallelly spaced, longitudinally extending support members,
      cable carrying means extending transversely between and secured to said support members,
      said cable carrying means having a cable contacting surface,
      a pair of parallelly spaced longitudinally extending side rail members located on the same side and spaced from said cable contacting surface, a plurality of longitudinally spaced side members securing each of said rail members with one of said first pair of members, the spacing between adjacent said side members being sufficient to admit entrance or exit of at least one of said cables, at least one of said longitudinally extending members being hollow, permitting wiring to be threaded therethrough;

said cable contacting surface of said main run support defining substantially a horizontal plane, the upper surfaces of said main run support members being not higher than said plane; and means securing said branch run support members and said branch run rail members to two of said longitudinally extending members of said main run support intermediate the longitudinal length of the latter so that said branch run has access to said main run without interrupting the longitudinal support for said main run.

5. In a cable support system as set forth in claim 4, wherein said branch run support is substantially vertically oriented with respect to said main run and that said securing means secures one of the ends of each of the longitudinally extending members of said branch run support to portions of the lengths of said longitudinally extending rail members of said main run support.

6. In a cable support system as set forth in claim 4, wherein said branch run support is horizontally oriented with respect to said main run support, said cable contacting surfaces of said main run support and said branch run support being substantially coplanar, and said securing means securing one of the ends of each of the longitudinally extending branch run rail members with portions of the length of one of said main run rail members and one of the ends of each of said branch run support members with portions of the length of one of said main run support members.

7. In a cable support system as set forth in claim 5, wherein at least one of said cable contacting surfaces defines a substantially continuous longitudinally extending cable contacting surface.

8. In a cable support system as set forth in claim 5, wherein at least one of said cable contacting surfaces defines a substantially noncontinuous longitudinally extending cable contacting surface.

9. In a cable support system for supporting a main run and a branch run of cables so as to permit the branch run to have access to said main run without interrupting the longitudinal support for said main run and comprising:

a main run support and at least one branch run support, each said support including:
a pair of spaced longitudinally extending support members;
cable carrying means extending transversely between said support members;
said cable carrying means having a cable contacting surface;
said cable contacting surface of said main run support defining substantially a horizontal plane, the upper surfaces of said main run support members being not higher than said plane;
said branch run support members extending at an angle to said main run support members;

means securing said branch run support members to at least one of said main run support members intermediate the longitudinal length of the latter so that said branch run has access to said main run without interrupting the longitudinal support for said main run;

at least said main run support including a pair of longitudinally extending side members, each said side member being substantially Z-shaped in cross section as defined by a lower inwardly extending flange and an upper outwardly extending flange interconnected by a substantially vertical extending member, said inwardly extending flanges serving to support said main run support members and each said side member being constructed of material to permit a portion of its length to be cut away without severing either of said main run support members.

10. A support system for supporting a main run and a branch run of cables and the like so as to permit the branch run to have access to said main run without interrupting the longitudinal support for said main run, comprising:

a main run support and at least one branch run support, at least one of said supports including:
a support section and strengthening means substantially coextensive with the support section but spaced from the support section;
the support section comprising a pair of spaced longitudinally extending support members;
cable carrying means extending transversely between said support members;
said cable carrying means having a cable contacting surface;
said cable contacting surface defining substantially a horizontal plane, the upper surfaces of said support members being not higher than said plane;
said branch run support members extending at an angle to said main run support members;
means securing said branch run support members to at least one of said main run support members intermediate the longitudinal length of the latter so that said branch run has access to said main run without interrupting the longitudinal support for said main run;
connecting means connecting said strengthening means to the support section comprising connections which are spaced apart longitudinally along the support section a distance sufficient to admit entrance or exit of at least one of said cables or the like to the run of said support.

References Cited

UNITED STATES PATENTS

| 2,662,709 | 12/1953 | Ullberg | 248—68 |
| 2,917,259 | 12/1959 | Hill | 248—68 |
| 3,281,005 | 10/1966 | Schumacher | 174—72 XR |

FOREIGN PATENTS

| 1,195,848 | 7/1965 | Germany. |

ROY D. FRAZER, *Primary Examiner.*

R. P. SEITTER, *Assistant Examiner.*